(12) United States Patent
Sumita et al.

(10) Patent No.: US 6,333,502 B1
(45) Date of Patent: Dec. 25, 2001

(54) RADIATION DETECTOR, RADIATION MEASUREMENT SYSTEM AND RADIATION MEASUREMENT METHOD

(75) Inventors: Akio Sumita, Yokohama; Tatsuyuki Maekawa, Shinagawa-ku, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/323,885

(22) Filed: Jun. 2, 1999

(30) Foreign Application Priority Data

Jun. 4, 1998 (JP) .................................................. 10-156223

(51) Int. Cl.$^7$ ...................................................... G01T 1/20
(52) U.S. Cl. .................... 250/366; 250/363.01; 250/368; 250/369
(58) Field of Search ............................. 250/366, 363.01, 250/369, 207, 368

(56) References Cited

U.S. PATENT DOCUMENTS

| | | | |
|---|---|---|---|
| 2,783,386 | * 2/1957 | Mandeville et al. | 250/366 |
| 3,102,954 | * 9/1963 | Richardson et al. | 250/369 |
| 4,437,007 | * 3/1984 | Koslow et al. | 250/366 |
| 4,578,213 | * 3/1986 | Simonetti | 252/301.17 |
| 4,713,198 | * 12/1987 | Simonetti | 252/301.17 |
| 5,225,351 | * 7/1993 | Noller | 436/172 |
| 5,286,973 | * 2/1994 | Westrom et al. | 250/253 |
| 5,352,040 | * 10/1994 | Mihalczo et al. | 374/131 |
| 5,629,515 | * 5/1997 | Maekawa | 250/207 |
| 5,744,804 | * 4/1998 | Meijer et al. | 250/369 |
| 6,087,664 | * 7/2000 | Gripp et al. | 250/394 |

FOREIGN PATENT DOCUMENTS

| | | |
|---|---|---|
| 3-242590 | 10/1991 | (JP) . |
| 6-258446 | 9/1994 | (JP) . |
| 10-90414 | 4/1998 | (JP) . |

* cited by examiner

*Primary Examiner*—Seungsook Ham
*Assistant Examiner*—Shun Lee
(74) *Attorney, Agent, or Firm*—Foley & Lardner

(57) ABSTRACT

A radiation detector D comprises: a scintillator 1, a main light guide 4, a wavelength shift fiber 5 passing through the main light guide 4, and an auxiliary light guide 2 provided between the scintillator 1 and the main light guide 4. The scintillator 1 is designed to emit scintillation light in response to incoming radiation. The main light guide 4 is surrounded by a plane 4a of incidence, for allowing the scintillation light to be incident thereon, and a reflecting surface for inwardly reflecting the scintillation light entering the plane 4a of incidence. The wavelength shift fiber 5 is designed to absorb the scintillation light entering the main light guide 4 to re-emit the scintillation light as fluorescent pulses of a longer wavelength to allow the re-emitted fluorescent pulses to simultaneously leave both ends 5a, 5b. In this radiation detector D, the scintillator 1 and the auxiliary light guide 2 are made of a material having a higher heat resisting temperature than that of the wavelength shift fiber 5.

4 Claims, 9 Drawing Sheets

(NORMALIZATION TEMPERATURE: 19°C)

| °C\°C | 0 | 1 | 2 | 3 | 4 | 5 | 6 | 7 | 8 | 9 |
|---|---|---|---|---|---|---|---|---|---|---|
| 10 | 1.03 | 1.03 | 1.02 | 1.02 | 1.02 | 1.02 | 1.01 | 1.01 | 1.01 | 1.00 |
| 20 | 1.00 | 1.00 | 0.99 | 0.99 | 0.98 | 0.98 | 0.98 | 0.97 | 0.97 | 0.96 |
| ⁓ | | | | | | | | | | |
| 90 | 0.57 | 0.57 | 0.56 | 0.56 | 0.55 | 0.55 | 0.54 | 0.54 | 0.53 | 0.53 |
| 100 | 0.52 | | | | | | | | | | ns
RADIATION DETECTOR, RADIATION MEASUREMENT SYSTEM AND RADIATION MEASUREMENT METHOD

BACKGROUND OF THE INVENTION

1. Field of the Invention

The present invention relates generally to a radiation detector and a radiation measurement system, which utilize a scintillator. More specifically, the invention relates to a radiation detector and a radiation measurement system, which can be applied in a high-temperature environment or in a temperature changing environment.

2. Description of the Related Art

Conventionally, there is known a radiation detector utilizing a scintillator for emitting a scintillation light in response to an incoming radiation. Examples of such conventional radiation detectors are shown in FIGS. 9 and 10.

First, the radiation detector shown in FIG. 9 comprises a scintillator 1 for emitting a scintillation light in response to an incoming radiation, a light guide (a main light guide) 4 optically connected to the scintillator 1 via an optical coupling material 3, and a wavelength shift fiber 5 passing through the light guide 4 (see "Optical Waveguide Scintillator" disclosed in Japanese Patent Laid-Open No. 6-258446).

The light guide 4 is surrounded by reflecting surfaces for inwardly reflecting the incoming scintillation light, except for a plane of incidence (a plane connected by the optical coupling material 3), on which the scintillation light emitted from the scintillator 1 is incident. The scintillation light entering the light guide 4 is stochastically incident on the wavelength shift fiber 5 by the function of the reflecting surfaces in a process where the light guide 4 is filled with the scintillation light.

The wavelength shift fiber 5 is designed to absorb the incoming scintillation light to re-emit light of a longer wavelength (fluorescent pulses) simultaneously from both end portions thereof.

The light emitted from both end portions of the wavelength shift fiber 5 are guided by light guiding fibers 6A and 6B to signal processing parts 7A and 7B, each of which comprises a photodetector and so forth, to be converted into electric pulses therein.

In such a radiation detector, electronic circuit parts, such as the signal processing parts 7A and 7B, can be arranged apart from the scintillator 1.

The radiation detector shown in FIG. 10 comprises a scintillator 1, and a signal processing part 17, which comprises a photodetector and so forth and which is directly connected to the scintillator 1 via an optical coupling material 3. In this radiation detector, since a scintillation light emitted from the scintillator 1 is directly incident on the signal processing part 17, the loss of the scintillation light is small, so that it is possible to obtain high radiation counting sensitivity.

In the case of the radiation detector shown in FIG. 10, the detector itself includes electronic circuit parts in the signal processing part 17. On the other hand, the radiation detector shown in FIG. 9 has the advantage of heat resistance since it is not required to provide any electronic circuits in the vicinity of the detector itself (the upper limit to the heat resisting temperatures of typical electronic circuits is about 50° C.).

In the radiation detectors described above, there is the following problem. That is, although there are some of scintillators 1 having a heat resisting temperature of about 200° C., the wavelength shift fiber 5 of component parts has only a heat resisting temperature of 70–80° C. since it is made of a plastic material, such as a polystyrene or a methacrylic resin. At present, there are no alternative parts having a higher heat resisting temperature, so that there is a problem in that conventional radiation detectors can not be used in an environment of a temperature exceeding 70–80° C.

In addition, when the radiation detector is provided in a temperature changing environment, it is difficult to hold the radiation measurement accuracy in accordance with such a temperature change. Particularly in the radiation detector shown in FIG. 10, the scintillator 1 is substantially integrated with the signal processing part 17, and the difference in heat conduction in component parts and the difference in the influence of temperature are intricately intertwisted. Therefore, it is not easy to carry out a temperature correction in the measurement of radiation since it is required to provide temperature compensating circuit means for controlling a high voltage applied to the photodetector by means of a thermistor, or an optical pulser for drift monitoring.

SUMMARY OF THE INVENTION

It is therefore a principal object of the present invention to eliminate the aforementioned problems and to provide a radiation detector capable of detecting radiation in an environment of a higher temperature than the heat resisting temperature of a wavelength shift fiber, and a radiation measurement system capable of accurately measuring radiation in a temperature changing environment with a simple construction.

In order to accomplish the aforementioned and other objects, according to one aspect of the present invention, a radiation detector comprises: a scintillator for emitting a scintillation light in response to an incoming radiation; a main light guide surrounded by a plane of incidence for allowing the scintillation light emitted from the scintillator to be incident thereon, and reflecting surfaces for inwardly reflecting the scintillation light entering the plane of incidence; a wavelength shift fiber passing through the main light guide, the wavelength shift fiber absorbing the scintillation light entering the main light guide to re-emit the absorbed scintillation light from both ends thereof; and an auxiliary light guide, provided between the scintillator and the plane of incidence of the main light guide, for guiding the scintillation light to the plane of incidence of the main light guide, wherein the scintillator and the auxiliary light guide are made of a material having a higher heat resisting temperature than that of the wavelength shift fiber.

According to this radiation detector, the scintillator can be exposed to an environment of a higher temperature than the heat resisting temperature of the wavelength shift fiber while the wavelength shift fiber is arranged in an environment of a temperature lower than or equal to the heat resisting temperature thereof. Therefore, it is possible to detect radiation in an environment of a higher temperature than the heat resisting temperature of the wavelength shift fiber without the need of any special cooling means.

The auxiliary light guide may comprise a liquid, through which the scintillation light is permeable, and a tube which is filled with the liquid and which is capable of inwardly total reflecting or specular reflecting the scintillation light. Thus, the scintillation light entering the auxiliary light guide from the scintillator is guided to the plane of incidence of the main light guide by the inwardly total reflecting or specular reflecting function in the tube of the auxiliary light guide.

Alternatively, the auxiliary light guide may comprise a tube capable of inwardly specular reflecting the scintillation light. Thus, the scintillation light entering the auxiliary light guide from the scintillator is guided to the plane of incidence of the main light guide by the inwardly specular reflecting function in the tube constituting the auxiliary light guide.

Moreover, the radiation detector may further comprise a light source for emitting a light of a particular wavelength, wherein one or both of the main light guide and the auxiliary light guide are made of a material capable of obtaining a photo-bleaching effect due to irradiation with the light of the particular wavelength, and the light emitted from the light source are able to be incident on one or both of the main light guide and the auxiliary light guide. Thus, the light having a particular wavelength emitted from the light source are incident on one or both of the main light guide and the auxiliary light guide, so that it is possible to suppress or restore the increase of light transmission loss due to radiation with respect to one or both of the main light guide and the auxiliary light guide by the photo-bleaching effect due to the incoming light having the particular wavelength.

According to another aspect of the present invention, a radiation measurement system comprises: a radiation detector including at least a scintillator, a main light guide, and a wavelength shift fiber for absorbing a scintillation light entering the main light guide from the scintillator to re-emit said absorbed scintillation light from both ends thereof; a pair of signal processing parts for converting the scintillation light leaving the both ends of the wavelength shift fiber of the radiation detector into electric pulse signals, respectively; a coincidence processing part for carrying out a coincidence processing of the electric pulse signals converted by the signal processing parts, to output coincidence processed data; temperature detecting means for detecting a temperature of the scintillator of the radiation detector or a temperature surrounding the scintillator; and a data processing part for calculating a radiation intensity based on the coincidence processed data and for making a correction in the radiation intensity on the basis of the temperature detected by the temperature detecting means in view of a temperature dependency of the scintillator of the radiation detector, when the radiation intensity is calculated, wherein at least the pair of signal processing parts, the coincidence processing part and the data processing part are arranged in an environment of a substantially constant temperature lower than or equal to heat resisting temperatures thereof.

According to this radiation measurement system, at least the pair of signal processing parts, the coincidence processing part and the data processing part are arranged in an environment of a substantially constant temperature so as not to be under the influence of temperature change. Therefore, when the data processing part calculates the radiation intensity based on the coincidence processed data, the high measurement accuracy of the radiation intensity can be held in accordance with the temperature change in an environment, in which the radiation detector is provided, only by correcting the radiation intensity on the basis of the temperature detected by the temperature detecting means in view of the temperature dependency of the scintillator. Therefore, the measurement of radiation in a temperature changing environment can be very accurately carried out with a simple construction.

In the above described radiation measurement system, the data processing part may make the correction using a relative value of a counting sensitivity corresponding to the temperature detected by the temperature detecting means, on the basis of previously obtained calibration data indicative of a correlation between the temperature of the scintillator of the radiation detector and the relative value of the counting sensitivity, when the radiation intensity is calculated.

According to another aspect of the present invention, a radiation measurement system comprises: a radiation detector including at least a scintillator, a main light guide, and a wavelength shift fiber for absorbing a scintillation light entering the main light guide from the scintillator to re-emit said absorbed scintillation light from both ends thereof; a pair of signal processing parts for converting the scintillation lights leaving the both ends of the wavelength shift fiber of the radiation detector into electric pulse signals, respectively; pulse width setting parts, each setting the electric pulse signals converted by each of the signal processing parts to be two or more kinds of pulse signals having different pulse widths; coincidence processing parts, each carrying out a coincidence processing of each of the pulse signals set by the pulse width setting parts, to output coincidence processed data corresponding to each of the pulse signals; and a data processing part for calculating a radiation intensity based on the coincidence processed data and for making a correction in the radiation intensity on the basis of the relationship between the coincidence processed data in view of a temperature dependency of the scintillator of the radiation detector, when the radiation intensity is calculated, wherein the pair of signal processing parts, the pulse width setting parts, the coincidence processing parts and the data processing part are arranged in an environment of a substantially constant temperature lower than or equal to heat resisting temperatures thereof.

According to this radiation measurement system, the signal processing part, the pulse width setting parts, the coincidence processing parts and the data processing part are arranged in an environment of a substantially constant temperature so as not to be under the influence of temperature change. Therefore, when the data processing part calculates the radiation intensity based on the coincidence processed data, the high measurement accuracy of the radiation intensity can be held in accordance with the temperature change in an environment, in which the radiation detector is provided, only by correcting the radiation intensity on the basis of the relationship between the coincidence processing data in view of the temperature dependency of the scintillator. Therefore, the measurement of radiation in a temperature changing environment can be very accurately carried out with a simple construction.

In this radiation measurement system, each of the coincidence processing parts may carry out a coincidence processing of two pulse signals set by two pulse width setting parts, and output a coincidence rate corresponding to each of the pulse signals as the coincidence processed data respectively, and the data processing part may make the correction using a relative value of a counting sensitivity corresponding to a ratio of two coincidence rates outputted from the coincidence processing parts, on the basis of previously obtained calibration data indicative of a correlation between the ratio of two coincidence rates and the relative value of the counting sensitivity, when the radiation intensity is calculated.

According to a further aspect of the present invention, there is provided a radiation measurement method using a radiation detector which includes at least a scintillator, a main light guide, and a wavelength shift fiber for absorbing a scintillation light entering the main light guide from the scintillator to re-emit said absorbed scintillation light from both ends thereof, the method comprising: a signal processing step of converting the light leaving the both ends of the wavelength shift fiber of the radiation detector into electric pulse signals, respectively; a pulse width setting step of setting the electric pulse signals converted at the signal processing step to be two or more kinds of pulse signals having different pulse widths; a coincidence processing step of carrying out a coincidence processing of each of the pulse signals set at the pulse width setting step, to output coincidence processed data corresponding to each of the pulse signals; and a data processing step of calculating a radiation intensity based on the coincidence processed data and of making a correction in the radiation intensity on the basis of the relationship between the coincidence processed data in view of a temperature dependency of the scintillator of the radiation detector, when the radiation intensity is calculated.

According to a still further aspect of the present invention, there is provided a computer readable storage medium having stored a radiation measurement program for causing a computer to execute a procedure for measurement radiation using a radiation detector which includes at least a scintillator, a main light guide, and a wavelength shift fiber for absorbing a scintillation light entering the main light guide from the scintillator to re-emit said absorbed scintillation light from both ends thereof, the procedure comprising: a signal processing step of converting the light leaving the both ends of the wavelength shift fiber of the radiation detector into electric pulse signals, respectively; a pulse width setting step of setting the electric pulse signals converted at the signal processing step to be two or more kinds of pulse signals having different pulse widths; a coincidence processing step of carrying out a coincidence processing of each of the pulse signals set at the pulse width setting step, to output coincidence processed data corresponding to each of the pulse signals; and a data processing step of calculating a radiation intensity based on the coincidence processed data and of making a correction in the radiation intensity on the basis of the relationship between the coincidence processed data in view of a temperature dependency of the scintillator of the radiation detector, when the radiation intensity is calculated.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Figure 9:
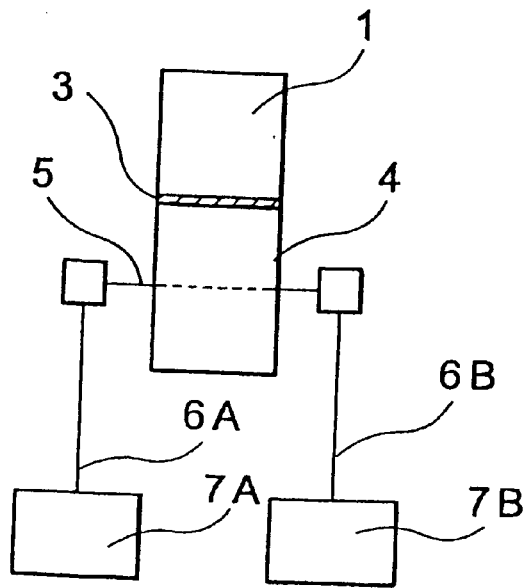
FIG. 9 is a schematic diagram of an example of a conventional radiation detector.
Figure 10:
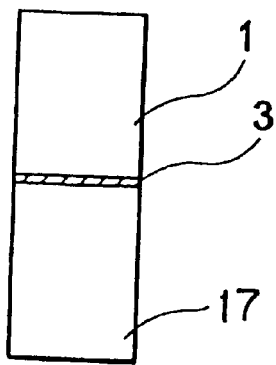
FIG. 10 is a schematic diagram of another example of a conventional radiation detector.

Referring now to the accompanying drawings, the preferred embodiments of the present invention will be described below. FIGS. 1 through 8 show the preferred embodiments of a radiation detection according to the present invention. Furthermore, in the preferred embodiments of the present invention shown in FIGS. 1 through 8, the same reference numbers as those in conventional examples shown in FIGS. 9 and 10 are used for the same components as those therein.

First Preferred Embodiment

First, referring to FIG. 1, the first preferred embodiment of a radiation detector according to the present invention will be described below.

Figure 1:
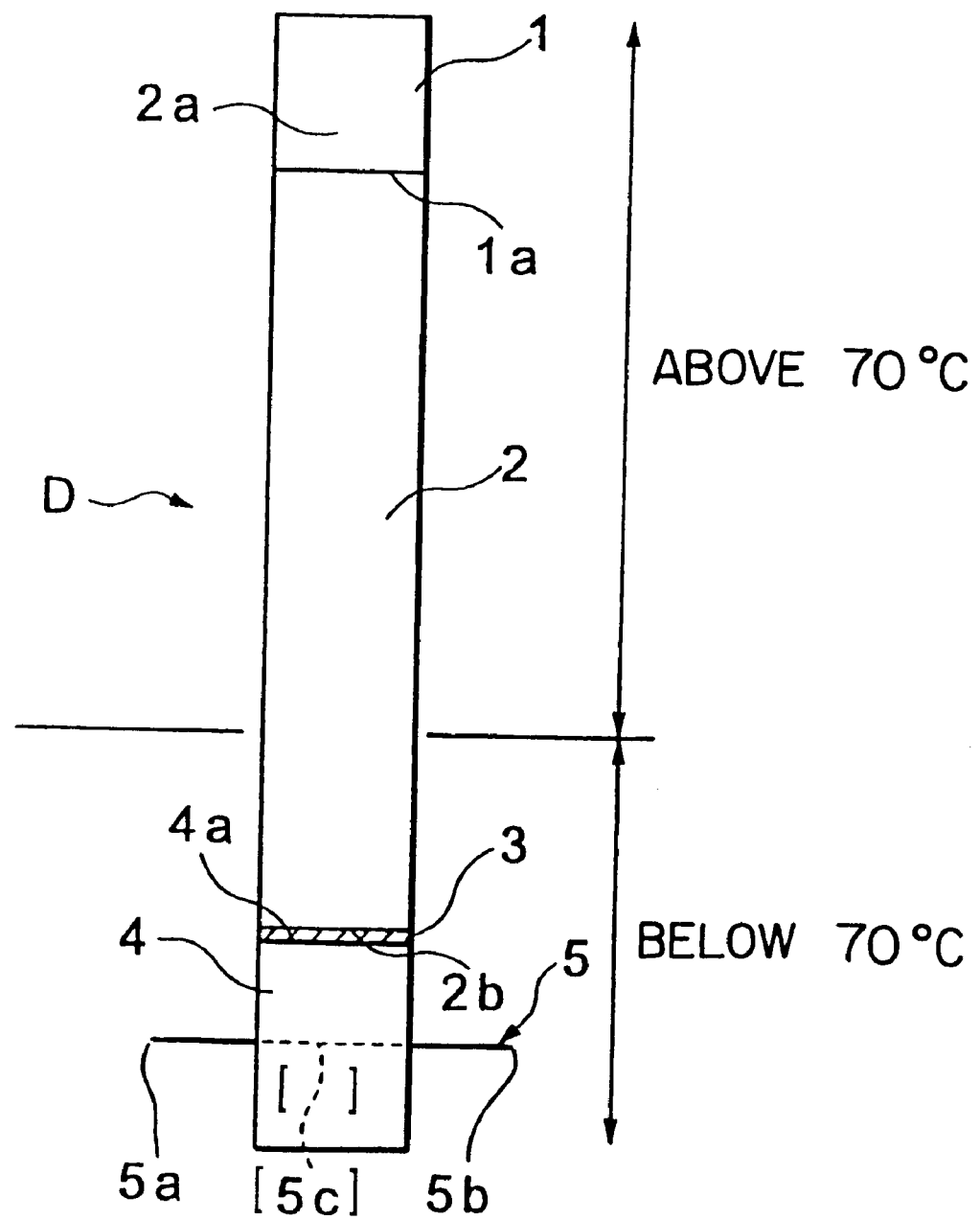
FIG. 1 is a schematic diagram of the first preferred embodiment of a radiation detector according to the present invention.

In FIG. 1, a radiation detector D comprises a scintillator 1, a main light guide 4, a wavelength shift fiber 5 passing through the main light guide 4, and an auxiliary light guide 2 provided between the scintillator 1 and the main light guide 4.

The scintillator 1 is made of, e.g., thallium-activated sodium iodide (NaI(Tl)), and designed to emit a scintillation light in response to an incoming radiation. The main light guide 4 is surrounded by a plane 4a of incidence for allowing the scintillation light emitted from the scintillator 1 to be incident thereon, and reflecting surfaces (surfaces other than the plane 4a of incidence) for inwardly reflecting the scintillation light having been incident on the plane 4a of incidence. In this case, each of the reflecting surfaces is formed by applying a reflecting material of, e.g., titanium oxide.

The wavelength shift fiber 5 comprises, e.g., a core including a phosphor, and a cladding covering the core. The wavelength shift fiber 5 is designed to absorb the scintillation light entering the main light guide 4 to re-emit fluorescent pulses of a longer wavelength simultaneously from both end portions 5a and 5b thereof.

Furthermore, the reflecting surfaces of the main light guide 4 have the function of enhancing the probability of incidence and absorption of the scintillation light on and into the wavelength shift fiber 5 by filling the main light guide 4 with the incoming scintillation light by the irregular reflection function.

The auxiliary light guide 2 has a plane 2a of incidence optically tightly connected to the optical output surface 1a of the scintillator 1, and an optical output surface 2b optically tightly connected to the plane 4a of incidence of the main light guide 4. The auxiliary light guide 2 is designed to guide the scintillation light, which as been incident on the plane 2a of incidence from the scintillator 1, to the optical output surface 2a by the total or specular reflection function to allow the guided scintillation light to be incident on the plane 4a of incidence of the main light guide 4.

Furthermore, the plane 4a of incidence of the main light guide 4 is connected to the optical output surface 2b of the auxiliary light guide 2 by means of an optical coupling material 3 of a transparent silicon grease or the like, whereas the optical output surface 1a of the scintillator 1 is connected directly to the plane 2a of incidence of the auxiliary light guide 2 without the need of any optical coupling materials in order to avoid the variation of state at a high temperature.

In such a radiation detector D, the scintillator 1 and the auxiliary light guide 2 are made of a material having a higher heat resisting temperature than that of the wavelength shift fiber 5. Specifically, the wavelength shift fiber 5 is made of a plastic material having a heat resisting temperature of 70~80° C., such as a polystyrene or a methacrylic resin, whereas the scintillator 1 and the auxiliary light guide 2 are made of a material having a heat resisting temperature of, e.g., 100° C. or higher.

Furthermore, the auxiliary light guide 2 comprises a prismatic or columnar body, such as a prism or a cylinder, made of, e.g., a material, through which the scintillation light is permeable and which has a greater refractive index than that of air. In this case, the scintillation light entering the auxiliary light guide 2 from the scintillator 1 is guided to the plane 4a of incidence of the main light guide 4 by the total reflection function on the inside of the surface of the auxiliary light guide 2 (the boundary between the surrounding air and the auxiliary light guide 2). Similarly, the auxiliary light guide 2 may comprise a bundle of optical fibers.

The auxiliary light guide 2 may comprise a liquid, through which the scintillation light is permeable, and a tube which is filled with the liquid and which is capable of inwardly total reflecting or specular reflecting the scintillation light.

Specifically, when a transparent tube is used as the tube of the auxiliary light guide 2, it is utilize the total reflection function due to the difference in refractive index between the surrounding air and the tube. When the tube of the auxiliary light guide 2 is an opaque tube having a specular-reflection-treated internal surface, or a transparent tube having a specular-reflection-treated external or internal surface, it is possible to utilize the specular reflection function.

In this case, the scintillation light entering the auxiliary light guide 2 is guided to the plane 4a of incidence of the main light guide 4 by the inwardly total or specular reflecting function in the tube of the auxiliary light guide 2.

Moreover, the auxiliary light guide 2 may comprise a tube capable of inwardly specular-reflecting the scintillation light.

In this case, the scintillation light entering the auxiliary light guide 2 is guided to the plane 4a of incidence of the main light guide 4 by the inwardly specular reflecting function in the tube constituting the auxiliary light guide 2.

With this construction, the functions and advantages of this preferred embodiment will be described below. According to this preferred embodiment, since the scintillator 1 and the auxiliary light guide 2 are made of a material having a higher heat resisting temperature than that of the wavelength shift fiber 5, the scintillator 1 can be exposed to an environment of a higher temperature than the heat resisting temperature of the wavelength shift fiber 5 while the wavelength shift fiber 5 is arranged in an environment of a lower temperature than the heat resisting temperature thereof.

Therefore, it is possible to detect radiation in an environment of a higher temperature than the heat resisting temperature of the wavelength shift fiber 5, without the need of any special cooling means or the like.

Specifically, assuming that the heat resisting temperature of the wavelength shift fiber 5 is about 70° C., the scintillator 1 can be exposed to an environment of a higher temperature (e.g., 100° C.) than the heat resisting temperature of the wavelength shift fiber 5, i.e., than 70° C., to detect radiation while the wavelength shift fiber 5 remains being arranged in an environment of a temperature of lower than or equal to 70° C. as shown in FIG. 1.

Second Preferred Embodiment

Figure 2:
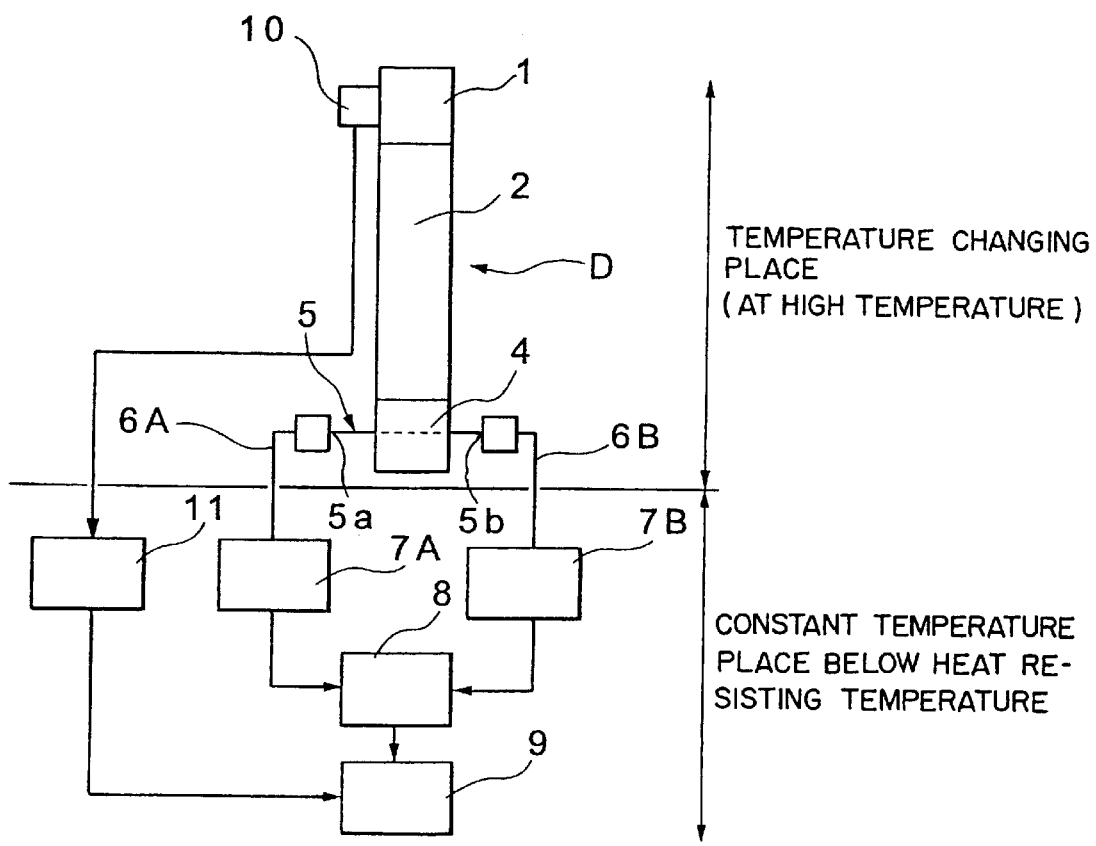
FIG. 2 is a block diagram of the second preferred embodiment of a radiation measurement system according to the present invention.
Figures 3A, 3B:
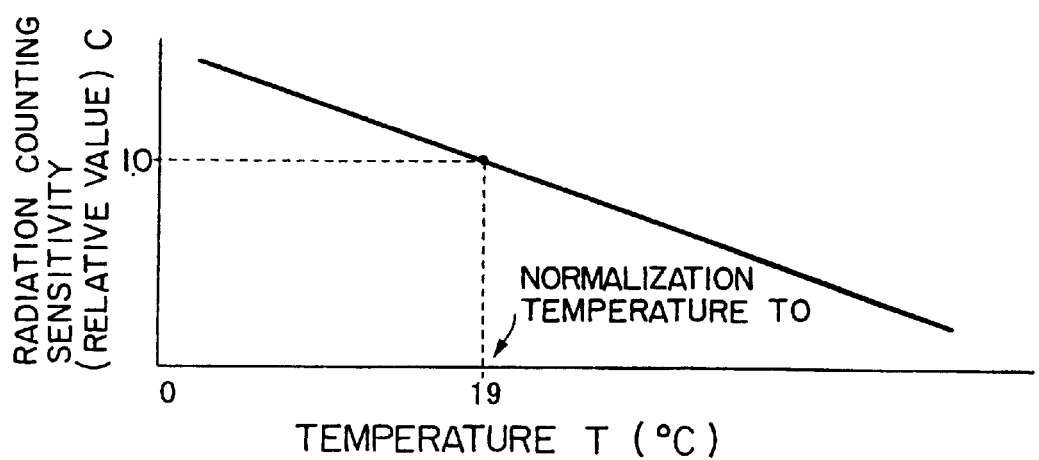
FIG. 3a is a graph showing an example of calibration data for use in a temperature correction for the radiation measurement system shown in FIG. 2, in the form of a calibration curve.
FIG. 3b is a table showing an example of calibration data for use in a temperature correction for the radiation measurement system shown in FIG. 2, in the form of a table of calibration values.
Figure 4:
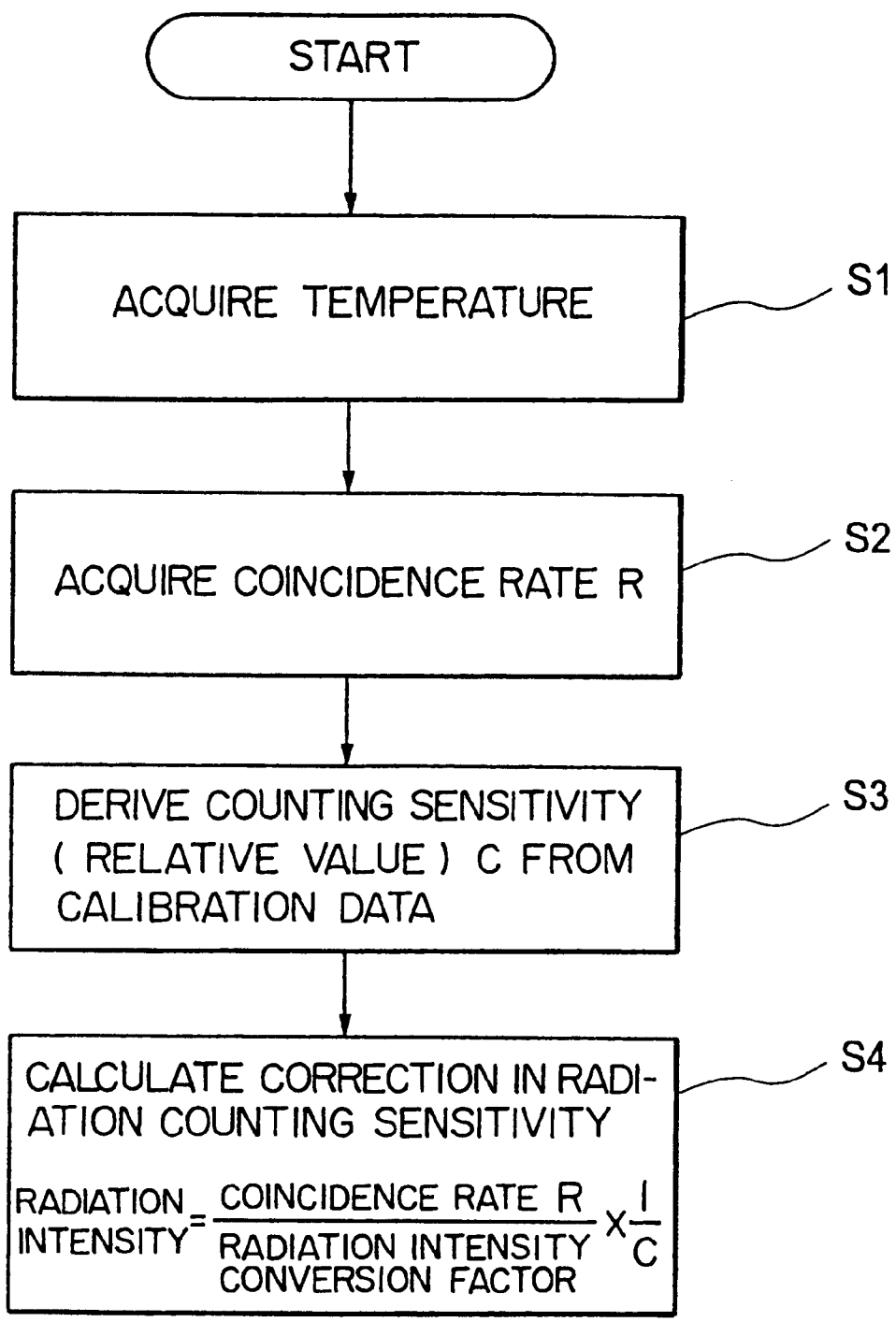
FIG. 4 is a flow chart showing a procedure for calculating a radiation intensity including a temperature correction for the radiation measurement system shown in FIG. 2.

Referring to FIGS. 2 through 4, the second preferred embodiment of a radiation measurement system according to the present invention will be described below. Furthermore, in the preferred embodiment shown in FIG. 2, the same reference numbers as those in the first preferred embodiment shown in FIG. 1 are used for the same components as those therein, and the detailed descriptions thereof are omitted.

In FIG. 2, the radiation measurement system comprises the same radiation detector D as that in the first preferred embodiment, a pair of signal processing parts 7A, 7B, a coincidence processing part 8, a data processing part 9 and temperature detecting means 10, 11.

The pair of signal processing parts 7A, 7B are connected to both end portions 5a, 5b of a wavelength shift fiber 5 of the radiation detector D by optical transmission means 6A, 6B, such as light guiding fibers, respectively. The signal processing parts 7A, 7B are designed to convert fluorescent pulses, which are emitted from the both end portions 5a, 5b of the wavelength shift fiber 5, into electric pulses, respectively. Specifically, each of the signal processing parts 7A, 7B comprises a photodetector of, e.g., a photomultiplier, a signal amplifier circuit, a signal detector circuit and so forth.

The coincidence processing part 8 is designed to carry out the coincidence processing of the electric pulses converted by the signal processing parts 7A, 7B to output coincidence rates R as coincidence processed data. Specifically, the coincidence processing part 8 comprises, e.g., a coincidence counter, a counter and an interface circuit between the coincidence processing part 8 and the data processing unit 9, and so forth.

The temperature detecting means 10, 11 comprise a temperature sensor (e.g., a thermocouple) 10 provided on or in the vicinity of the scintillator 1 of the radiation detector D, and a temperature measuring instrument 11 connected to the temperature sensor 10.

The coincident processing part 8 and the temperature measuring instrument 11 are connected to the data processing part 9. Utilizing the interface circuit of the coincidence processing part 8, the coincidence rates R outputted from the coincidence processing part 8 are transmitted to the data processing part 9 on-line. The data processing part 9 is designed to read the detected temperature out of the temperature measuring instrument 11 using temperature reading means to record the read temperature therein.

The data processing part 9 is designed to calculate a radiation intensity based on the coincidence rates R serving as the coincidence processed data, and to correct the radiation intensity on the basis of the temperature detected by the temperature detecting means 10, 11 in view of a temperature dependency of the scintillator 1, which will be described later, when the radiation intensity is calculated.

In this radiation measurement system, the radiation detector D and the temperature sensor 10 are arranged in a temperature changing environment. On the other hand, the signal processing parts 7A, 7B, the coincidence processing part 8, the data processing part 9 and the temperature measuring instrument 11 are arranged in an environment of a substantially constant temperature lower than or equal to the heat resisting temperatures (e.g., 50° C.) thereof (e.g., in a temperature-controlled measuring chamber in a nuclear installation).

In this case, the radiation detector D and the temperature sensor 10 may be arranged in an environment of a high temperature (e.g., 50° C. or higher), it is required to arrange at least the wavelength shift fiber 5 in an environment of a temperature lower than or equal to the heat resisting temperature (e.g., 70° C.) thereof, similar to the first preferred embodiment. In addition, in this preferred embodiment, since the temperature detecting means 10, 11 has the temperature measuring instrument 11 including electronic circuit parts, only the temperature measuring instrument 11 is arranged in the same temperature environment as that for the data processing part 9 and so forth.

The calculation of the radiation intensity, which includes a correction taking account of the temperature dependency of the scintillator 1, in the data processing part 9 will be described in detail below.

The scintillator 1 of, e.g., thallium-activated sodium iodide (NaI(Tl)), has a temperature dependency so that its emission decay time is shortened to reduce an emission amount as temperature rises. Therefore, the radiation counting sensitivity of the radiation detector D decreases as the temperature of the scintillator 1 rises.

Therefore, the relationship between the counting sensitivity, which is obtained by measuring a radiation field having a constant intensity, and the temperature T of the scintillator 1 is previously examined to obtain calibration data indicative of a correlation between the relative value C of the counting sensitivity and the temperature T as shown in FIG. 3a and FIG. 3b.

The calibration data shown in FIG. 3a and FIG. 3b shows an example of data indicative of relative values C of measurement sensitivities at the respective temperatures T assuming that the counting sensitivity is 1.0 at a normalization temperature T0 =19° C., in the form of a calibration curve (FIG. 3a) and in the form of a table of calibration values (FIG. 3b).

Referring to a flow chart of FIG. 4, a procedure for calculating a radiation intensity in the data processing part 9 will be described below. In FIG. 4, a detected temperature is first acquired from the temperature measuring instrument 11 (step S1), and a coincidence rate R is acquired from the coincidence processing part 8 (step S2). Then, referring to calibration data shown in FIG. 3a and FIG. 3b, a relative value C of a counting sensitivity corresponding to the detected temperature is derived (step S3). Then, a previously determined radiation intensity conversion factor, the coincidence rate R and the relative value C of the counting sensitivity are used to calculate a corrected radiation intensity (=coincidence rate R/radiation intensity conversion factor×(1/C)) (step S4).

While the coincidence processing part 8 has outputted the coincidence rate R as the coincidence processed data, the coincidence processing part 8 may output a coincidence value r and a counting time t as the coincidence processed data, and the data processing part 9 may calculate a coincidence rate R on the basis of the coincidence value r and the counting time t.

With this construction, the functions and advantages of this preferred embodiment will be described below. In this preferred embodiment, the signal processing parts 7A, 7B, the coincidence processing part 8, the data processing part 9 and the temperature measuring instrument 11 are arranged in an environment of a substantially constant temperature so as not to be under the influence of temperature change.

Therefore, when the data processing part 9 calculates a radiation intensity based on the coincidence processed data, it is possible to hold the high measurement accuracy of the radiation intensity in the temperature change in an environment, in which the radiation detector D is provided, only by correcting the radiation intensity on the basis of the temperature detected by the temperature detecting means 10, 11 in view of the temperature dependency of the scintillator 1. Therefore, it is possible to very accurately measure radiation in a temperature changing environment with a simple construction.

Third Preferred Embodiment

Figure 5:
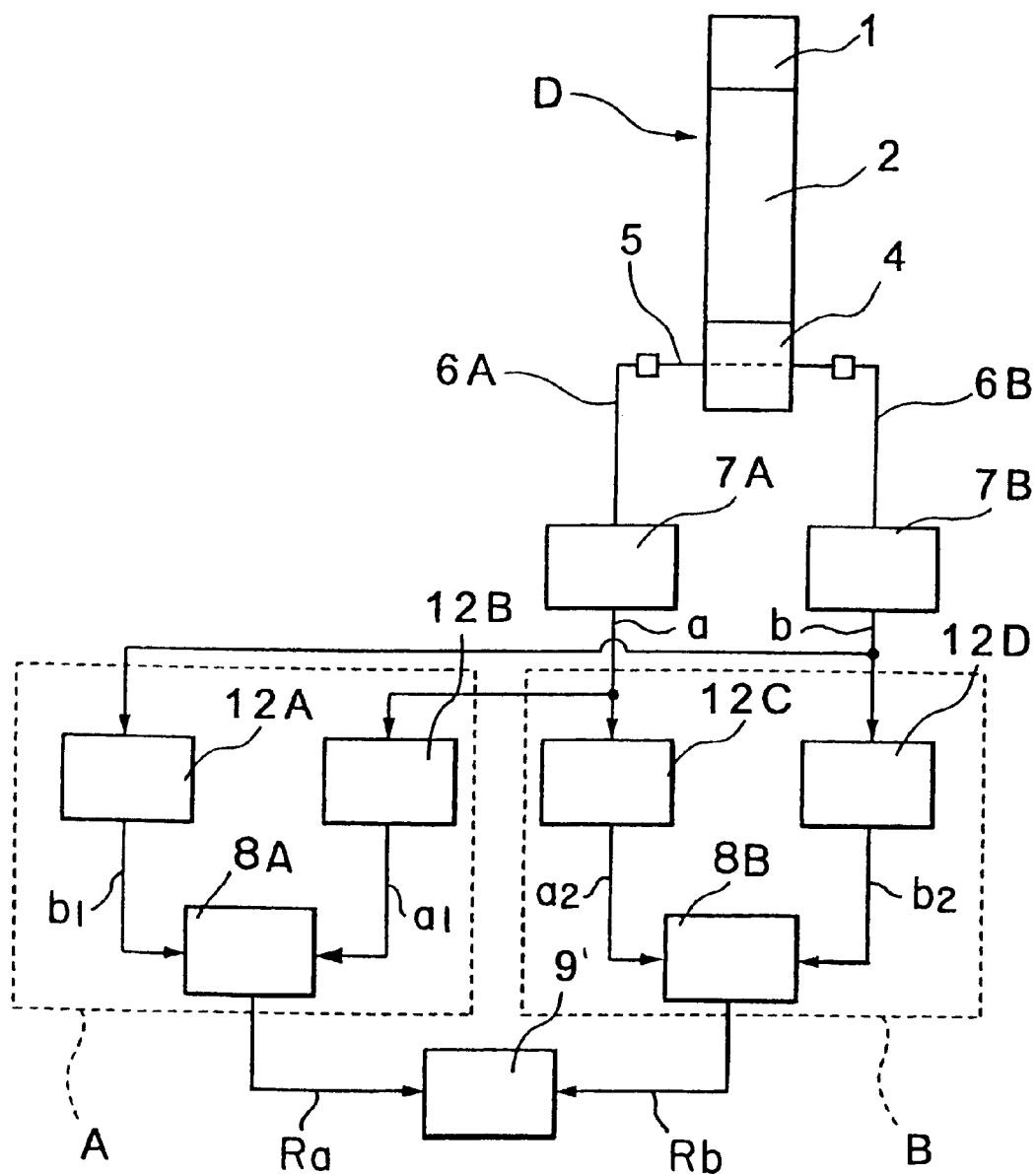
FIG. 5 is a block diagram of the third preferred embodiment of a radiation measurement system according to the present invention.
Figure 6A:
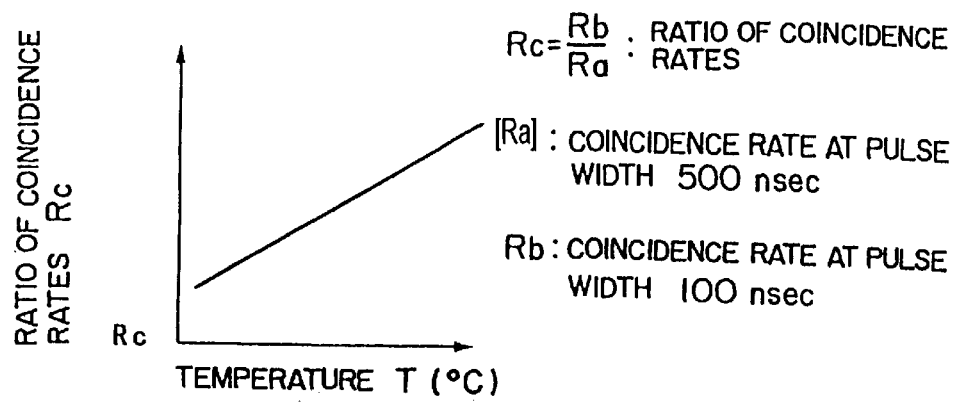
FIG. 6a is a graph showing the relationship between temperatures and ratios of coincidence rates, as an example of a calibration curve for use in a temperature correction for the radiation measurement system shown in FIG. 5.
Figure 6B:
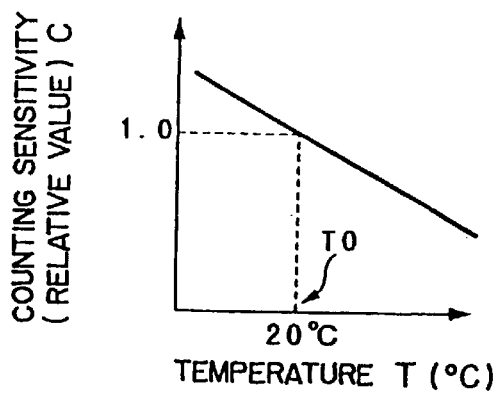
FIG. 6b is a graph showing the relationship between temperatures and relative values of measurement sensitivities, as an example of a calibration curve for use in a temperature correction for the radiation measurement system shown in FIG. 5.
Figure 6C:
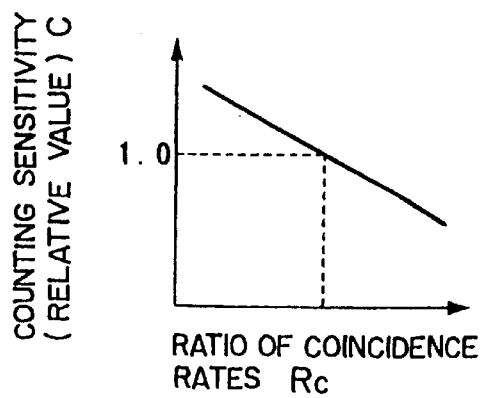
FIG. 6c is a graph showing the relationship between ratios of coincidence rates and relative values of measurement sensitivities, as an example of a calibration curve for use in a temperature correction for the radiation measurement system shown in FIG. 5.
Figure 7:
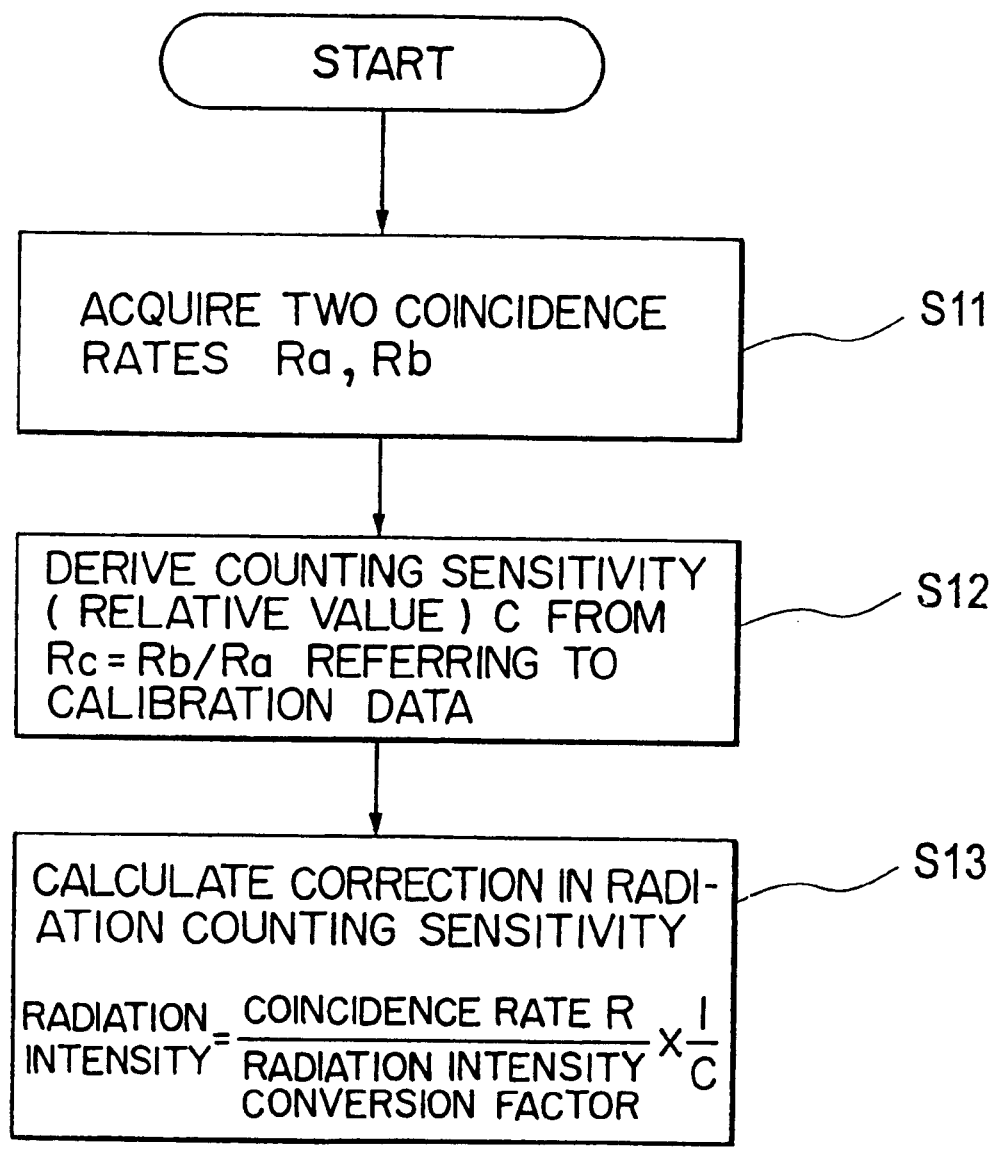
FIG. 7 is a flow chart showing a procedure for calculating a radiation intensity including a temperature correction for the radiation measurement system shown in FIG. 5.

Referring to FIGS. 5 through 7, the third preferred embodiment of a radiation measurement system according to the present invention will be described below. As shown in FIG. 5, this preferred embodiment is substantially the same as the second preferred embodiment, except that the temperature detecting means 10, 11 are omitted and that signal systems A and B and a data processing part 9' are substituted for the coincidence processing part 8 and the data processing part 9.

Specifically, as shown in FIG. 5, the signal systems A has a pair of pulse width setting parts 12A, 12B and a coincidence processing part 8A, and the signal systems B has a pair of pulse width setting parts 12C, 12D and a coincidence processing part 8B.

The pulse width setting parts 12A, 12B of the signal system A are designed to set electric pulse signals b, a, which have been converted by the signal processing parts 7B, 7A, respectively, to be pulse signals b1, a1, which have a pulse width of, e.g., 500 nsec, respectively. The pulse width setting parts 12c, 12B of the signal system B are designed to set the electric pulse signals a, b to be pulse signals a2, b2, which have a pulse width of, e.g., 100 nsec, respectively.

In this case, the pulse widths set by the pulse width setting parts 12A, 12B and 12C, 12D are examples based on the fact that the emission decay time of the scintillation light emitted by the scintillator 1 of thallium-activated sodium iodide is about 230 nsec (for example, the pulse width of 500 nsec is about twice as long as the emission decay time of 230 nsec).

The coincidence processing 8A of the signal system A is designed to carry out the coincidence processing of the respective pulse signals b1, a1 set by the corresponding pulse width setting parts 12A, 12B, to output a coincidence rate Ra corresponding to the pulse signals b1, a1 as coincidence processed data. On the other hand, the coincidence processing part 8B of the signal system B is designed to carry out the coincidence processing of the respective pulse signals a2, b2 set by the corresponding pulse width setting parts 12C, 12D, to output a coincidence rate Rb corresponding to the pulse signals a2, b2 as coincidence processed data.

Furthermore, other constructions of the coincidence processing parts 8A, 8B are substantially the same as those in the second preferred embodiment. Utilizing the interface circuits of the coincidence processing parts 8A, 8B, the coincidence rates Ra, Rb outputted from the coincidence processing parts 8A, 8B are transmitted to the data processing part 9' on-line.

The data processing part 9' is designed to calculate a radiation intensity based on the coincidence rates Ra, Rb serving as the coincidence processed data, and to correct the radiation intensity on the basis of the relationship between the coincidence rates Ra, Rb in view of a temperature dependency of the scintillator 1 when the radiation intensity is calculated.

Also in this radiation measurement system similar to the radiation measurement system in the second preferred embodiment (see FIG. 2), the radiation detector D is arranged in a temperature changing environment, whereas the signal processing parts 7A, 7B, the pulse width setting parts 12A through 12D, the coincidence processing parts 8A, 8B, and the data processing part 9' are arranged in an environment of a substantially constant temperature lower than or equal to the heat resisting temperatures thereof (e.g., 50° C.).

Similar to the second preferred embodiment, although the radiation detector D may be arranged in an environment of a high temperature (e.g., 50° C. or higher), it is required to arrange at least the wavelength shift fiber 5 in an environment of a temperature lower than or equal to the heat resisting temperature thereof (e.g., 70° C.).

The calculation of the radiation intensity, which includes a correction taking account of the temperature dependency of the scintillator 1, in the data processing part 9' will be described in detail below.

As described above, the scintillator 1 of, e.g., thallium-activated sodium iodide (NaI(Tl)), has a temperature dependency so that its emission decay time is shortened as temperature rises. Therefore, the luminous efficiency decreases to decrease the radiation counting sensitivity of the radiation detector D, and the time jitter for generating fluorescent pulses reaching the signal processing parts 7A and 7B decreases.

As shown in FIG. 6a, a ratio of two coincidence rates (a coincidence rate ratio) Rc=Rb/Ra based on the different pulse widths (500 nsec, 100 nsec) increases as the temperature T of the scintillator 1 rises.

On the other hand, FIG. 6b shows an example of a correlation (normalization temperature T0=20° C.) between the temperature T of the scintillator 1 and the relative value C of the counting sensitivity, which has been obtained by examining the relationship between the temperature T and the counting sensitivity previously obtained by measuring a radiation field having a predetermined intensity.

From the relationship between the ratio Rc of the coincidence rates and the temperature T shown in FIG. 6a and the relationship between the relative value C of the counting sensitivity and the temperature T shown in FIG. 6b, calibration data indicative of the correlation between the ratio Rc of the coincidence rates and the relative value C of the counting sensitivity is obtained as shown in FIG. 6c.

Referring to a flow chart of FIG. 7, a procedure for calculating a radiation intensity in the data processing part 9' will be described below. In FIG. 7, coincidence rates Ra, Rb are acquired from the coincidence processing parts 8A, 8B (step S11). Then, a ratio Rc=Rb/Ra of the two coincidence rates is derived, and a relative value C of a counting sensitivity corresponding to the ratio Rc of the coincidence rates is derived referring to the calibration data shown in FIG. 6c as an example (step S12). Then, the previously determined radiation intensity conversion factor, the coincidence rates and the relative value C of the counting sensitivity are used to calculate a corrected radiation intensity (=coincidence rate R/radiation intensity conversion factor×(1/C)) (step S13).

While the coincidence processing parts 8A, 8B have outputted the coincidence rates Ra, Rb as the coincidence processed data, respectively, the coincidence processing parts 8A, 8B may output coincidence values ra, rb and counting times ta, tb as the coincidence processed data, and the data processing part 9' may calculate coincidence rates Ra, Rb on the basis of the coincidence values ra, rb and the counting times ta, tb.

With this construction, the functions and advantages of this preferred embodiment will be described below. In this preferred embodiment, the signal processing parts 7A, 7B, the pulse width setting parts 12A through 12D, the coincidence processing parts 8A, 8B and the data processing part 9' are arranged in an environment of a substantially constant temperature so as not to be under the influence of temperature change.

Therefore, when the data processing part 9' calculates a radiation intensity based on the coincidence processed data, it is possible to hold the high measurement accuracy of the radiation intensity in accordance with the temperature change in an environment, in which the radiation detector D is provided, only by correcting the radiation intensity on the basis of the ratio Rc=Rb/Ra of the coincidence rates in view of the temperature dependency of the scintillator 1. Therefore, it is possible to very accurately measure radiation in a temperature changing environment with a simple construction.

In addition, it is not required to provide the temperature detecting means for use in the radiation measurement system in the second preferred embodiment, additional electronic parts having a temperature dependency, and complicated systems, such as a TAC (time-to-amplitude converter) and a TDC (time-to-digital converter) usually for use in the counting of time intervals.

While the ratio Rc of the coincidence rates has been used as the reference of the temperature correction in the measurement of the radiation intensity, a difference in the coincidence rates may be used in place of the ratio Rc of the coincidence rates. In addition, while the two signal systems A, B have been provided to use the relationship between the coincidence rates Ra, Rb based on two pulse signals having different pulse widths, three or more signal systems may be provided to use the relationship between coincidence rates based on three or more pulse signals having different pulse widths.

The radiation measurement procedure executed in the radiation measurement system in this preferred embodiment may be recorded in a computer readable storage medium as a radiation measurement program for causing a computer to execute the radiation measurement procedure, which comprises:

(1) a signal processing step of converting light emitted from both end portions 5a, 5b of the wavelength shift fiber 5 of the radiation detector D, into electric pulse signals a, b, respectively;

(2) a pulse width setting step of setting the electric pulse signals a, b converted at the signal processing step, to be two or more kinds of pulse signals a1, b1, a2, b2 having different pulse widths;

(3) a coincidence processing step of carrying out the coincidence processing of the pulse signals a1, b1 and a2, b2 set at the pulse width setting step, to output coincidence rates (coincidence processed data) Ra, Rb corresponding to the pulse signals a1, b1 and a2, b2, respectively; and (4) a data processing step of calculating a radiation intensity based on the coincidence rates (the coincidence processed data) Ra, Rb, and correcting the radiation intensity on the basis of the relationship between the coincidence processed data in view of the temperature dependency of the scintillator 1 of the radiation detector D when the radiation intensity is calculated.

If the radiation measurement program is read out of the storage medium by means of a computer, the radiation measurement procedure in the radiation measurement system in this preferred embodiment can be executed by the computer.

While the radiation detector D in the first preferred embodiment has been used in the second or third preferred embodiment, a radiation detector having no auxiliary light guide 2 (e.g., the conventional radiation detector shown in FIG. 9) may be used.

Fourth Preferred Embodiment

Figure 8:
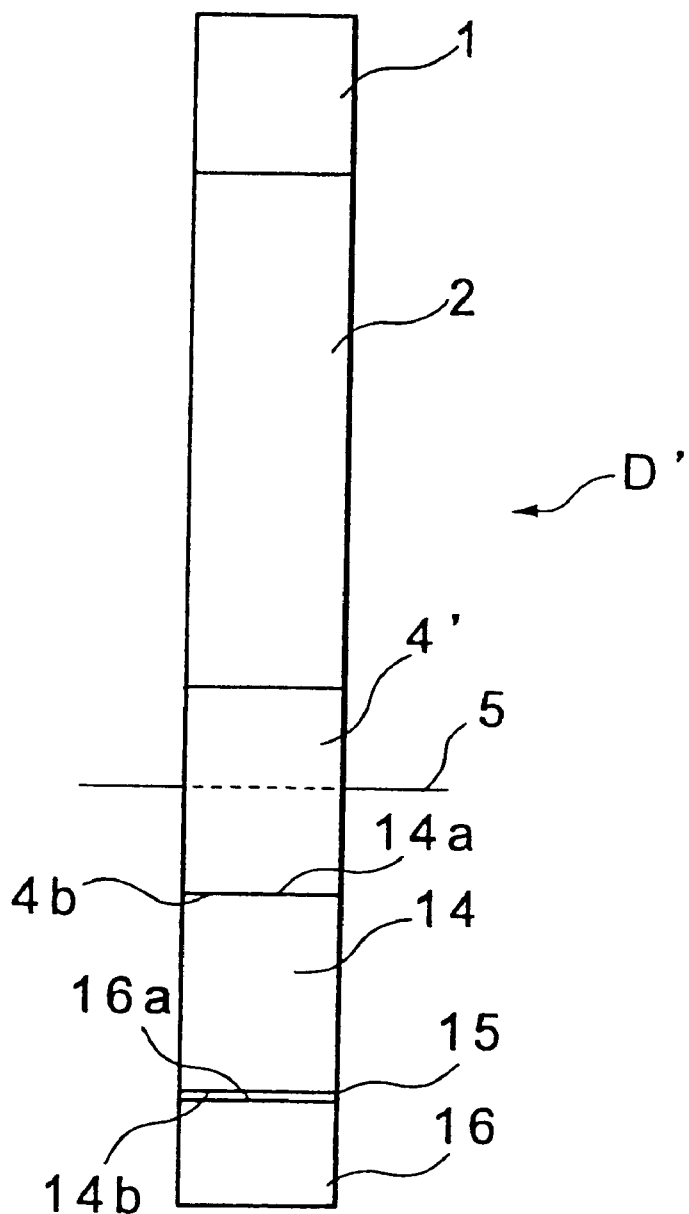
FIG. 8 is a schematic diagram of the fourth preferred embodiment of a radiation detector according to the present invention.

Referring to FIG. 8, the fourth preferred embodiment of the present invention will be described below. This preferred embodiment is the same as the second preferred embodiment shown in FIG. 2 and the third preferred embodiment shown in FIG. 5, except that a radiation detector D' shown in FIG. 8 is substituted for the radiation detector D shown in FIG. 1, 2 or 5 to be applied to the second or third preferred embodiment.

The radiation detector D' in this preferred embodiment shown in FIG. 8 has a light source 16 for emitting light of a particular wavelength. One or both of a main light guide 4' and an auxiliary light guide 2 are made of a material capable of obtaining a photo-breaching effect due to irradiation with the light having the particular wavelength. The light emitted from the light source 16 can be incident on the main light guide 4' and the auxiliary light guide 2. Other constructions are substantially the same as those of the radiation detector D shown in FIG. 1.

The photo-bleaching effect is a phenomenon that the increase of light transmission loss of a material, such as a glass or a transparent resin, wherein the light transmission loss has been increased with radiation, is suppressed or restored by irradiating the material with light having a particular wavelength.

The light source 16 may be, e.g., a white light source. As shown in FIG. 8, a light entrance window is formed in the bottom surface 4b of the main light guide 4', and a second auxiliary light guide 14 having an optical output surface 14a and a plane 14b of incidence is provided between the bottom surface 4b of the main light guide 4' and the optical output surface 16a, to allow light emitted from the light source 16 to be incident on the main light guide 4'.

With such a construction, the functions and advantages of this preferred embodiment will be described below. In this preferred embodiment, light having a particular wavelength emitted from the light source 16 are incident on one or both of the main light guide 4' and the auxiliary light guide 2, so that it is possible to suppress or restore the increase of light transmission loss due to radiation with respect to one or both the main light guide 4' and the auxiliary light guide 2 by the photo-bleaching effect due to the incoming light having the particular wavelength.

Furthermore, when there is some fear that any one of the light guides 2, 4' and 14 (made of, e.g., a resin material) may be damaged by ultraviolet rays included in the light emitted from the light source 16, it is possible to avoid such fear of damage by providing an ultraviolet filter 15 between the optical output surface 16a of the light source 16 and the plane 14b of incidence of the second auxiliary light guide 14 as shown in FIG. 8.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A radiation measurement system comprising:
   a radiation detector including at least a scintillator, a main light guide, and a wavelength shift fiber, having first and second ends, for absorbing a scintillation light entering said main light guide from said scintillator to re-emit said absorbed scintillation light from said first and second ends;
   a pair of signal processing parts for converting said scintillation light leaving said first and second ends of said wavelength shift fiber of said radiation detector into first and second electric pulse signals, respectively;
   pulse width setting parts, setting said first and second electric pulse signals converted by said signal processing parts to be two or more pairs of first and second pulse signals, said pairs each having different pulse widths;
   coincidence processing parts, each carrying out a coincidence processing of each pair of said first and second pulse signals set by said pulse width setting parts, to output coincidence processed data corresponding to each pair of said first and second pulse signals, respectively; and
   a data processing part for calculating a radiation intensity based on said coincidence processed data and for making a correction in said radiation intensity on the basis of the relationship between said coincidence processed data in view of a temperature dependency of said scintillator of said radiation detector, when said radiation intensity is calculated.

2. A radiation measurement system as set forth in claim 1, wherein each of said coincidence processing parts carries out a coincidence processing of a corresponding pair of said first and second pulse signals, and outputs a coincidence rate corresponding to said corresponding pair of said pulse signals as said coincidence processed data, respectively, and
   wherein said data processing part makes said correction using a relative value of a counting sensitivity corresponding to a ratio of two coincidence rates outputted from said coincidence processing parts, on the basis of previously obtained calibration data indicative of a correlation between a ratio of two coincidence rates and said relative value of said counting sensitivity, when said radiation intensity is calculated.

3. A radiation measurement method using a radiation detector which includes at least a scintillator, a main light guide, and a wavelength shift fiber, having first and second ends, for absorbing a scintillation light entering said main light guide from said scintillator to re-emit said absorbed scintillation light from both ends thereof, said method comprising:
   a signal processing step of converting said light leaving said first and second ends of said wavelength shift fiber of said radiation detector into first and second electric pulse signals, respectively;
   a pulse width setting step of setting said first and second electric pulse signals converted at said signal processing step to be two or more pairs of first and second pulse signals, said pairs each having different pulse widths;

a coincidence processing step of carrying out a coincidence processing of each pair of said first and second pulse signals set at said pulse width setting step, to output a coincidence processed data corresponding to each pair of said first and second pulse signals, respectively; and a data processing step of calculating a radiation intensity based on said coincidence processed data and of making a correction in said radiation intensity on the basis of the relationship between said coincidence processed data in view of a temperature dependency of said scintillator of said radiation detector, when said radiation intensity is calculated.

4. A computer readable storage medium having stored a radiation measurement program for causing a computer to execute a procedure for measuring radiation using a radiation detector which includes at least a scintillator, a main light guide, and a wavelength shift fiber, having first and second ends, for absorbing a scintillation light entering said main light guide from said scintillator to re-emit said absorbed scintillation light from said first and second ends, said procedure comprising:

a signal processing step of converting said light leaving said first and second ends of said wavelength shift fiber of said radiation detector into first and second electric pulse signals, respectively;

a pulse width setting step of setting said first and second electric pulse signals converted at said signal processing step to be two or more pairs of first and second pulse signals, said pairs each having different pulse widths;

a coincidence processing step of carrying out a coincidence processing of each pair of said first and second pulse signals set at said pulse width setting step, to output a coincidence processed data corresponding to each pair of said first and second pulse signals, respectively; and a data processing step of calculating a radiation intensity based on said coincidence processed data and of making a correction in said radiation intensity on the basis of the relationship between said coincidence processed data in view of a temperature dependency of said scintillator of said radiation detector, when said radiation intensity is calculated.

* * * * *